UNITED STATES PATENT OFFICE.

WALTER G. CLARK AND HERSCHEL C. PARKER, OF NEW YORK, N. Y., ASSIGNORS TO PARKER-CLARK ELECTRIC COMPANY, OF NEW YORK, N. Y., A CORPORATION OF NEW JERSEY.

PROCESS OF MAKING ELECTRIC-LAMP FILAMENTS.

No 876,331.   Specification of Letters Patent.   Patented Jan. 14, 1908.

Application filed November 30, 1906. Serial No. 345,835.

*To all whom it may concern:*

Be it known that we, WALTER G. CLARK, of the city, county, and State of New York, and HERSCHEL C. PARKER, of the city of New York, county of Kings, and State of New York, have invented a new and Improved Process of Making Electric-Lamp Filaments, of which the following is a full, clear, and exact description.

We have demonstrated by many experiments that many processes heretofore tried for coating a filament with silicon have been unsatisfactory owing to the fact that no means was provided for taking up chlorin or hydro-chloric acid freed by the processes where the processes employed a hydro-carbon and some volatile silicon chlorid. Our experiments have demonstrated that it was essential to provide only such hydro-carbons as will break up at the temperature produced, and combine with the chlorin liberated, forming thereby a new product containing chlorin, hydrogen and carbon, that occasionally this proper combination was found in illuminating gas, but as the composition of illuminating gas varies from time to time, depending on method of manufacture, temperature conditions, etc., it would be only by accident that the proper combination would be secured, and when secured, the presence of other hydro-carbons which broke up and deposited carbon at the temperature attained, produced a filament of low resistance and containing but a comparatively small percentage of silicon. We have found that the proper combination is what is known as marsh gas together with sufficient olefiant gas to take up the hydro-chloric acid produced in breaking up the silicon chlorid. In addition to this, we find that it is necessary to introduce carbon dioxid gas, in order to complete the reaction, when pure silicon deposit is desired. The reaction claimed by ourselves and by others in previous applications and patents, has been as follows. (Volatile silicon compound)

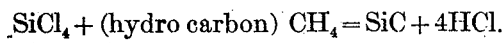

In this reaction it was found that the chlorin as freed immediately re-combined with the silicon until the deposit secured was practically carbon, but assuming that all silicon was deposited, the resultant product would be Si−C−4HCl, so that as much carbon would be deposited as silicon, but as the Si was attacked by either the Cl or the HCl at this temperature, only a small amount of Si was deposited with the C, but with the combination of marsh gas, olefiant gas, and carbon dioxid, together with the volatile silicon compound or silicon tetra-chlorid, we secure the following reaction:—

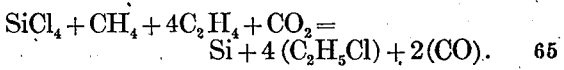

By this reaction it will be noted that the chlorin is taken care of in the formation of ethyl-chlorid $C_2H_5l$, or $C_2H_4l$ ethylene-chlorid, and that carbon dioxid is reduced to carbon monoxid, thereby taking care of the other atom of carbon. If we omit the $CO_2$ we find that we secure a deposit on the filament of silicon and carbon, but with the correct proportions of $CO_2$ present, the deposit on the filament is rich in silicon.

During our early experiments we were deceived into thinking that any hydro-carbon gas would bring about the necessary reaction, by the fact that the illuminating gas we were using at that time happened to contain a small percentage of the above named gases which brought about the reaction, but by a long series of experiments, and by elimination, we have ascertained just what is necessary to bring about the reaction, and present our claim as a method of securing a deposit rich in silicon by breaking up or disassociating volatile silicon chlorid in the presence of a hydro-carbon gas preferably marsh gas containing a sufficient percentage of olefiant gas to take up the hydrochloric acid or chlorin, freed in breaking up the silicon chlorid, thereby forming a compound of chlorin, hydrogen and carbon, which may be either ethyl-chlorid or ethylene chlorid, or both, and providing carbon dioxid gas or some other similar agent is used to take up and combine with the carbon freed from the marsh gas at the time of the disassociation of the hydrogen and carbon of that gas, when a deposit very rich in silicon is secured.

Having thus fully described our invention, we claim as new and desire to secure by Letter Patent:—

1. The herein described process of making electric light filaments, which consists in heating a filament by passing a current through it, and thereby depositing silicon on the filament from a volatile chlorid, by breaking up the chlorid through the agency of marsh gas and a reactive agent, and in the presence of a suitable absorbent for the freed hydrochloric acid or chlorin.

2. The herein described process of making filaments for incandescent lamps, which consists in passing an electric current through a filament, in an atmosphere containing marsh gas, olefiant gas, and a reactive agent containing oxygen, together with a volatile silicon compound.

3. The herein described process of making filaments for incandescent electric lamps, which consists in heating a filament by passing an electric current through it in an atmosphere containing marsh gas, olefiant gas, carbon dioxid, and a substance containing silicon, whereby we secure the following reaction:—

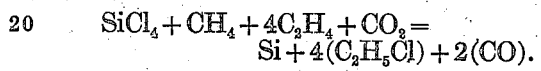

$$SiCl_4 + CH_4 + 4C_2H_4 + CO_2 = Si + 4(C_2H_5Cl) + 2(CO).$$

4. The herein described process of making electric lamp filaments which consists in passing a current of electricity through a filament base in a vapor of silicon compound containing chlorin together with a reactive agent, a hydro-carbon and an absorbent to combine with the substance freed by the reduction of the silicon compound.

5. The herein described process of making filaments for incandescent lamps, which consists in passing an electric current through the filament, thereby heating it, in an atmosphere containing a silicon compound, marsh gas, olefiant gas, and carbon-dioxid.

WALTER G. CLARK.
HERSCHEL C. PARKER.

Witnesses:
WARREN B. HUTCHINSON,
FRANK L. STUBBS.